United States Patent
Guha et al.

(10) Patent No.: US 9,463,584 B2
(45) Date of Patent: Oct. 11, 2016

(54) SILSESQUIOXANE MOLD RELEASE COATING FOR UNSATURATED POLYESTER THERMOSET MOLDING COMPOUNDS

(75) Inventors: Probir Kumar Guha, Troy, MI (US); Michael J. Siwajek, Oakland Township, MI (US)

(73) Assignee: BANK OF AMERICA, N.A., AS ADMINISTRATIVE AGENT, Chicago, IL (US)

( * ) Notice: Subject to any disclaimer, the term of this patent is extended or adjusted under 35 U.S.C. 154(b) by 427 days.

(21) Appl. No.: 13/555,703

(22) Filed: Jul. 23, 2012

(65) Prior Publication Data

US 2013/0129917 A1    May 23, 2013

Related U.S. Application Data

(60) Provisional application No. 61/510,203, filed on Jul. 21, 2011.

(51) Int. Cl.
*B29C 33/64* (2006.01)

(52) U.S. Cl.
CPC ..................................... *B29C 33/64* (2013.01)

(58) Field of Classification Search
CPC .......... B22C 3/00; B29C 33/60; B29C 33/64
USPC ..................................... 264/299, 328.1, 338
See application file for complete search history.

(56) References Cited

U.S. PATENT DOCUMENTS

| | | | |
|---|---|---|---|
| 4,367,262 A * | 1/1983 | Vaughn, Jr. ................... | 428/331 |
| 5,039,771 A | 8/1991 | Morimoto et al. | |
| 5,047,492 A | 9/1991 | Weidner et al. | |
| 7,217,683 B1 * | 5/2007 | Blanski et al. ............... | 508/208 |
| 7,687,593 B2 * | 3/2010 | Yamahiro et al. .............. | 528/31 |
| 7,868,198 B2 | 1/2011 | Laine et al. | |
| 8,840,992 B2 * | 9/2014 | Iizuka et al. .................. | 428/323 |
| 2009/0012317 A1 * | 1/2009 | Laine et al. .................. | 549/215 |

* cited by examiner

*Primary Examiner* — James Sanders
(74) *Attorney, Agent, or Firm* — Avery N. Goldstein; Blue Filament Law PLLC

(57) ABSTRACT

The process for molding a thermoset sheet-molding composition or bulk-molding composition is provided that includes the exposure of a mold surface to a silsesquioxane monomer or pre-polymer material under conditions to induce polymerization of said material or said monomer to form a mold release coating on the surface. The thermoset sheet-molding composition or bulk-molding composition is then injected into the mold and into contact with said coating under conditions to cure the composition to form an article.

17 Claims, No Drawings

SILSESQUIOXANE MOLD RELEASE COATING FOR UNSATURATED POLYESTER THERMOSET MOLDING COMPOUNDS

CROSS REFERENCE TO RELATED APPLICATIONS

This application claims priority benefit of U.S. Provisional Application Ser. No. 61/510,203 filed 23 Jul. 2011; the contents of which are hereby incorporated by reference.

FIELD OF THE INVENTION

The present invention in general, relates to an improved process for molding thermoset articles and, in particular, to coating a mold with a silsesquioxane release composition to promote multiple article release from the mold surfaces so coated.

BACKGROUND OF THE INVENTION

During the molding process, a solid article is produced from thermoset resins such as SMC or BMC compositions based on unsaturated polyesters or vinyl esters. These articles often adhere to mold surfaces thereby interfering with article detachment from the mold and slowing mold throughput. The problem is particularly acute for SMC and BMC materials that have low viscosity formulations containing liquid monomers and flowing fibers and other fillers that are allowed to flow into contact with and, in some instances, wet shape determining surfaces of a mold then to build viscosity according to controlled kinetic schedules. With this intimate contact encouraging adhesion of the resultant molded article to the mold surfaces.

To promote the molding process, manufacturers often resort to a mold release agent that facilitates the release of the molded article from the mold. Internal mold release agents such as magnesium stearate and stearic acid are often included in a sheet molding composition (SMC) or bulk molding composition (BMC) to promote release of the molded article from the mold. However, such release agents tend to be uniformly distributed throughout the molding composition and as a result pulling a small percentage of the total mold release composition internal to the SMC or BMC actually functions in a mold release capacity. Adding additional quantities of internal mold release composition to the thermosetting composition to improve mold release comes at the cost of other physical properties of the resultant molded article.

Another general class of mold release agents is external mold release agents that are applied directly to mold surfaces that come into contact with molding composition. The procedure of applying an external mold release to the mold surfaces tends to slow throughput since the mold release must be repeatedly applied to the mold surfaces between individual article moldings. Additionally, the mold release agents tend to build up on the mold surfaces thereby negatively impacting the tolerances of the molded articles and as such, buildup of the mold release agent on the mold surface must be periodically removed there from, resulting in still further costly and time consuming delays to mold throughput.

Conventionally, silicone compositions have been used as mold release agents and have suffered considerable difficulties that have limited their usefulness. Specifically, uncured silicones such as polysiloxane waxes and fluids tend to transfer to the resultant molded article during the de-molding process and require frequent reapplication to the mold. Additionally, this transfer of silicone materials to the molded article negatively impacts the ability to further process the molded article by interfering with paint and other over-layer coatings. Even upon cure, silicone compositions tend to have poor abrasions resistance and are readily abraded and removed from the mold surface by the SMC or BMC molding composition flowing into the mold and containing abrasive materials such as chopped glass fiber and inorganic filler particulate. Additionally, thermoset resin cure inhibitors and catalysts can chemically interact with the mold release agent and degrade the same.

Thus, there exists a need for an external mold release for SMC and BMC formulations that overcomes the problems associated with silicone mold releases. There further exists a need for a process to use such a mold release to increase molding throughput of SMC and BMC thermoset articles.

SUMMARY OF THE INVENTION

The process for molding a thermoset sheet-molding composition or bulk-molding composition is provided that includes the exposure of a mold surface to a silsesquioxane monomer or pre-polymer material under conditions to induce polymerization of said material or said monomer to form a mold release coating on the surface. The thermoset sheet-molding composition or bulk-molding composition is then injected into the mold and into contact with said coating under conditions to cure the composition to form an article.

DETAILED DESCRIPTION OF THE PREFERRED EMBODIMENTS

The present invention has utility as a mold with enhanced mold release properties through application of a silsesquioxane coating thereon that limits adhesion of an SMC or BMC composition thereto, especially, such compositions based on unsaturated polyesters including isocyanate functionalities that cure to form urethane or urea linkages. According to the present invention before an SMC or BMC formulation is loaded into contact with a mold surface, a silsesquioxane mold release composition is applied to the mold surface. A silsesquioxane monomer, or pre-polymer each have at least 2 reactive moieties capable of curing to form a silsesquioxane polymer formulation. Generally, it has been found that higher viscosity, longer chain length silsesquioxanes provide tougher coatings while shorter, lower viscosity silsesquioxane monomers and pre-polymers generally provide coatings that release molded SMC or BMC articles more easily. An often preferred embodiment of the present invention, a mixture of lower and higher molecular weight silsesquioxane monomers and pre-polymers are used in an inventive composition to form a mold release coating. A preferred mixture of silsesquioxane materials contains 5 to 40 percent by weight of silsesquioxane monomers having an average molecular weight of between 55 and 700 while the remainder of the silsesquioxane polymeric coating precursors have a molecular weight in the range of between 200 and 4000. It is appreciated that silsesquioxane precursors that have a degree of tertiary functionality promotes inducing cure to form a tougher resultant coating. Preferably, the degree of active functionality to silsesquioxane precursors according to the present invention is between to 1.0 and 2.6.

The silsesquioxane materials can be any of the types described in U.S. Pat. No. 4,781,844 (Kortmann, et al), U.S. Pat. No. 4,351,736 (Steinberger et al.), U.S. Pat. No. 5,073,442 (Knowlton et al.) or U.S. Pat. No. 3,493,424 (Mohrlok et al.) each of which are incorporated herein by reference. These silsesquioxanes are of the formula R—Si(OR')$_3$ alone or together with silanes of the formula Si(OR')$_4$ wherein R represents a substituted or unsubstituted C$_{1-7}$ alkyl or alkenyl, with optional substituents of a halogen atom, amino, mercapto or epoxy substituents, and up to 95% of the R groups may be methyl moieties. R' represents a C$_{1-4}$ alkyl. Preferred silsesquioxanes are those that are neutral or anionic.

The silsesquioxanes may be prepared by adding silanes to a mixture of water, a buffer, a surface active agent and optionally an organic solvent, while agitating the mixture under acidic or basic conditions. It is preferable to add the quantity of silane uniformly and slowly in order to achieve a narrow particle size of 20 to 50 nanometers. The exact amount of silane which can be added depends on the substituent R and whether an anionic or cationic surface active agent is used.

Copolymers of the silsesquioxanes in which the units can be present in block or random distribution are formed by the simultaneous hydrolysis of the silanes. The preferred amount of silane of the formula Si(OR')$_4$ added is about 2 to 50 percent, relative to the total weight of the silanes employed, preferably 3 to 20 percent.

The following silanes are useful in preparing the silsesquioxanes of the present invention: methyltrimethoxysilane, methyltriethoxysilane, methyltriisopropoxyoxysilane, ethyltrimethoxysilane, ethyltriethoxysilane, propyltrimethoxysilane, isobutyltrimethoxysilane, isobutyltriethoxysilane, 2-ethylbutyltriethoxysilane, tetraethoxysilane, and 2-ethylbutoxytriethoxysilane.

These silsesquioxane is readily dissolved or dispersed in water in amounts ranging from 0.0001 to 3 total weight percent in water. The resulting aqueous composition of silsesquioxane is optionally acidified through the addition of an inorganic or organic acid. An acid, if present, preferably modifies the pH to a pH of less than 5 and preferably of less than 2. The silsesquioxane solution is readily applied to a conventional feedstock of natural cellulosic filler through conventional techniques such as spring the solution onto the filler or stirring the filler in the solution for a period of time to allow migration of the silsesquioxane to the filler surface followed by removal and drying prior to intermixing with thermoset resin formulation components.

Generally, a silsesquioxane has a structure RSiO$_{3/2}$ where R is the moiety is C$_{1-3}$ alkyl, vinyl, C$_{1-3}$ fluoroalkyl, C$_{1-3}$ perfluoroalkyl, γ-glycidoxypropyl, and γ-methacryloxypropyl. Such silsesquioxanes are operative to yield a mold release coating form SMC or BMS molded product forming. The synthesis and application of precursors to form a silsesquioxane coating are conventional to the art, as shown for example in U.S. Pat. No. 3,944,702.

An additional class of silsesquioxanes operative herein are multifunctional silsesquioxanes having at least two moieties per polyhedral assembly that through selection of the moieties and reaction thereof, mold release coating properties can be adjusted. Through moiety selection, mold release coating properties that are controlled include cross-linking, surface energy modification, hydrophilicity, and combinations thereof. The synthesis and application of precursors to form a ladder-type polysiloxanes, and other organo-functional silsesquioxanes coating are conventional to the art, as shown for example in U.S. Pat. No. 5,039,771; U.S. Pat. No. 5,047,492; U.S. Pat. No. 7,256,243; U.S. Pat. No. 7,868,198; and WO02/100867. Exemplary multi-functional silsesquioxanes operative herein include polycyclic octa-silsesquioxane, triethoxy silylethyl methyl siloxy silsesquioxane, tetrahydridodimuthylsiloxyoctasil, tetraoxyethanoltetratriathoxysilylethane silsesquioxane, (tetratriethoxysilylethyldimethylsiloxy)(tetraglycidyldimethylsiloxy)octa-silsesquioxane (TGTSE), and combinations thereof.

It is appreciated that various silsesquioxanes, including monomers, oligomers, and multi-functional silsesquioxanes, as well as polysiloxanes are readily intermixed to form an inventive mold release coating and to achieve a greater degree of variability of properties that accommodate properties of specific SMC or BMC part moldings. Upon account for molding composition resin viscosity, mold dwell time, and cure temperature; an inventive mold coating is applied that tolerates multiple moldings cycles without modifying the inventive coating and includes at least 2, 10, 30, 50, 70, and even 100 molding cycles before mold release coating must be reapplied to the mold surface. A benefit of an inventive mold release coating being stable to molding conditions is that the cured mold release coating is not readily transferred to the molded components thereby facilitating subsequent processing and painting of the molded parts.

Optionally, the silsesquioxane includes a dispersion of inorganic particulate to further harden the mold release coating. Inorganic particulate operative herein illustratively include colloidal silica, alumina, ceria, or combinations thereof. The inorganic particulate, if present, preferably is dispersed within a matrix of mold release silicon based polymer of the present invention. A typical particulate filler diameter size is in the range of 5 to 150 microns. It is appreciated that shapes other than spherical particulate are operative herein, these include rods, clusters of spheroids, or combinations thereof.

Optionally, 1 to 70 dry coating weight percent inorganic particulate is uniformly dispersed in a matrix of RSiO$_{3/2}$ where R is the moiety is C$_{1-3}$ alkyl, vinyl, C$_{1-3}$ fluoroalkyl, C$_{1-3}$ perfluoroalkyl, γ-glycidoxypropyl, or γ-methacryloxypropyl.

Optionally, the mold release coating encompasses fiber filler therein to strengthen the coating and add resiliency during molded product release from the mold and contact with the mold release coating. Fiber fillers operative herein illustratively include glass, carbon, polyamide, or combinations thereof. Fiber filler loading is typically from 1 to 70 dry coating weight percent.

An inventive mold release coating is readily formed by combined matrix precursors with inorganic particulate, such as a dispersion of colloidal silica in a C$_1$-C$_6$ water miscible solvent-water solution with a partial condensate of a silanol of the formula RSi(OH)$_3$ where R is the moiety is C$_{1-3}$ alkyl, vinyl, C$_{1-3}$ fluoroalkyl, C$_{1-3}$ perfluoroalkyl, γ-glycidoxypropyl, or γ-methacryloxypropyl. Optionally, at least 70 weight percent of the silanol is CH$_3$Si(OH)$_3$, and the composition contains 1 to 40 weight percent solids, the solids being 0 to 75 weight percent particulate, fiber or a combination of such fillers and 100 to 25 weight percent of the partial condensate. Preferably, the composition has a pH of 3.0 to 6.0, or is adjusted through acid addition to be so. The composition then cures the partial condensate to form the inventive mold release coating after application to a mold surface.

An exemplary mold release coating is formed by coating a mold surface with a partial condensate present in a solvent. In this embodiment, a majority of the partial condensate is CH$_3$Si(OH)$_3$ with lesser amounts of aliphatically unsaturated trisilanols being present; along with solvent and optional fillers being present. Trisilanols of the structure RSi(OH)$_3$, where R is the moiety is C$_{1-3}$ alkyl, vinyl, C$_{1-3}$ fluoroalkyl, C$_{1-3}$ perfluoroalkyl, γ-glycidoxypropyl, or γ-methacryloxypropyl are generated in situ by adding the corresponding trialkoxysilanes to an acidic solution optionally containing the fillers. Exemplary trialkoxysilanes are those containing methoxy, ethoxy, isopropoxy and t-butoxy substituents which upon hydrolysis liberate the corresponding alcohol. Upon generation of the silanol in the acidic aqueous solution condensation of the hydroxyl substituents yields Si—O—Si bond formation. The resulting siloxane retains a quantity of silicon-bonded hydroxyl groups which render the polymer soluble in the aqueous-organic solution that during condensation provides a silsesquioxane, $RSiO_{3/2}$. The mold release matrix precursors along with any particulate are dispersed in a solution of the siloxanol in a $C_1$-$C_6$ alcohol-water solution, optional water-miscible cosolvents include such as acetone, and butyl cellosolve. To provide shelf life and minimize gelation in the mold release precursor mixture acid is added to provide a pH of 2.5 to 6.5. Acids operative herein illustratively include hydrochloric, acetic, chloroacetic, citric, benzoic, dimethylmalonic, formic, glutaric, glycolic, maleic, malonic, toluene-sulfonic, and oxalic.

An inventive mold release coating is prepared by combining trialkoxysilanes, such as $RSi(OCH_3)_3$, to a filler dispersion dispersion after adjusting the pH of the dispersion to the desired level by addition of the acid, or the acid can be added to either the silane or the hydrosol prior to mixing the two components, provided that the mixing is done rapidly. Depending upon the percent solids desired in the final composition, additional alcohol, water or a water-miscible solvent are readily added. The resulting mold release coating precursor age for a short period of time to ensure formation of the partial condensate. The composition thus obtained is a clear or slightly hazy low viscosity dispersion which is stable for days. The shelf life of the precursor composition is extended by maintaining the dispersion at below room temperature, for example at 10 degrees Celsius (° C.).

Buffered latent condensation catalysts are optionally added to the mold release coating precursor to modify cure conditions, to speed cure, and to improve properties in the mold release coating. Catalysts operative herein include alkali metal salts of carboxylic acids, such as potassium formate; amine carboxylates; and quaternary ammonium carboxylates. These specifically include dimethylamine acetate, ethanolamine acetate, dimethylaniline formate, tetraethylammonium benzoate, sodium acetate, sodium propionate, sodium formate or benzyltrimethylammonium acetate. The amount of catalyst is varied depending upon the desired curing condition, and if present is at 0.1 to 5 weight percent of the precursor present in the mold release coating mixture.

An exemplary mold release precursor composition has a pH in the range of 4-5 and includes 0 to 20 dry film weight percent 10-60 micron colloidal silica and 0 to 5 dry film weight percent of chopped glass fiber. The partial condensate of $CH_3Si(OH)_3$ is present in an amount in the range of 35 to 55 weight percent of the total solids in a cosolvent of methanol, isopropanol and water, with the alcohols representing from 30 to 60 weight percent of the cosolvent and a catalyst benzyltrimethylammonium acetate is present at 0.1 total solids weight percent. This precursor mixture has a shelf life of approximately one month. When coated onto a mold surface, an inventive mold release coating is cured in a relatively short time at temperatures in the range of 75-125° C.

An inventive mold release coating precursor mixture is coated onto a mold surface by conventional application techniques that illustratively include spraying, dipping, brushing and the like.

After application of the mold release coating mixture to a mold surface, the solvent component is evaporated and the siloxane portion cured. Curing via further condensation of the silanol functionality to form Si—O—Si bonds occurs at room temperature with higher temperatures accelerating the cure rate.

Upon curing, an mold release coating results that is silsesquioxane polymer with the optional fillers held in a matrix formed by the polymer. The mold release coating is then amenable to multiple SMC or BMC molding between re-applications to the mold surface.

The references cited herein are indicative of the level of the prior art to which the invention pertains. These patents and publications are incorporated herein by reference to the same extent as if each individual patent or publication was explicitly and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A process for molding a thermoset sheet molding composition comprising:
    applying a silsesquioxane monomer of $RSi(OH)_3$, where R is the moiety is $C_{1-3}$ alkyl, vinyl, γ-glycidoxypropyl, or γ-methacryloxypropyl to a mold surface;
    curing via condensation silanol functionality in said silsesquioxane monomer to form Si—O—Si bonds and form a silsesquioxane polymer mold release coating on the mold surface that is stable to SMC molding conditions;
    introducing the thermoset sheet molding composition into the mold, the thermoset sheet molding composition containing monomers and fibers, and into contact with said mold release coating under conditions to cure the thermoset sheet molding composition to form a molded article, the fibers being glass, carbon, or a combination thereof;
    removing the molded article from the mold and
    introducing another thermoset sheet molding composition into the mold to form another article without the addition of more silsesquioxane monomer to the mold surface;
    wherein said silsesquioxane monomer is a mixture of 5 to 40 percent by weight of silsesquioxane monomers having an average molecular weight of between 55 and 700 and a remainder of coating precursors have a molecular weight in the range of between 200 and 4000.

2. The process of claim 1 wherein the mold surface is formed of steel.

3. The process of claim 1 wherein the mold surface is formed of aluminum, or alloys thereof.

4. The process of claim 1 wherein the mold surface is formed of ceramic.

5. The process of claim 1 wherein said silsesquioxane polymer comprises $RSiO_{3/2}$ where R is $C_1$-$C_3$ alkyl, vinyl, glycidoxypropyl, or methacryloxypropyl.

6. The process of claim 1 wherein said silsesquioxane polymer comprises a polycyclic octasilsesquioxane.

7. The process of claim 1 wherein said silsesquioxane polymer comprises a triethoxy silylethyl methyl siloxy silsesquioxane.

8. The process of claim 1 wherein said silsesquioxane polymer comprises a tetrahydridodimethylsiloxyoctasil.

9. The process of claim 1 wherein said silsesquioxane polymer comprises a tetraoxyethanoltetratriethoxysilylethane silsesquioxane.

10. The process of claim 1 wherein said silsesquioxane polymer comprises (tetratriethoxysilylethyldimethylsiloxy)(tetraglycidyldimethylsiloxy)octa-silsesquioxane.

11. The process of claim 1 further comprising removing said article from contact with said coating.

12. The process of claim 1 wherein repeating the injecting to form another article occurs at least 10 times.

13. The process of claim 1 wherein repeating the injecting to form another article occurs at least 30 times.

14. The process of claim 1 wherein repeating the injecting to form another article occurs at least 50 times.

15. The process of claim 1 wherein repeating the injecting to form another article occurs at least 70 times.

16. The process of claim 1 wherein repeating the injecting to form another article occurs at least 100 times.

17. The process of claim 1 further comprising suspending colloidal silica or glass fibers in the silsesquioxane monomer.

* * * * *

UNITED STATES PATENT AND TRADEMARK OFFICE
CERTIFICATE OF CORRECTION

PATENT NO. : 9,463,584 B2  
APPLICATION NO. : 13/555703  
DATED : October 11, 2016  
INVENTOR(S) : Probir Kumar Guha et al.

Page 1 of 1

It is certified that error appears in the above-identified patent and that said Letters Patent is hereby corrected as shown below:

On title page at (73): Replace "BANOF AMERICA, N.A., AS ADMINISTRATIVE AGENT, Chicago, IL (US)", with --CONTINENTAL STRUCTURAL PLASTICS, INC., Auburn Hills, MI (US)--.

Signed and Sealed this  
Sixth Day of December, 2016

Michelle K. Lee  
*Director of the United States Patent and Trademark Office*